US012673440B2

(12) United States Patent
Van De Schootbrugge et al.

(10) Patent No.: US 12,673,440 B2

(45) Date of Patent: Jul. 7, 2026

(54) MONITORING USAGE OF A HAIR CUTTING DEVICE

(71) Applicant: KONINKLIJKE PHILIPS N.V., Eindhoven (NL)

(72) Inventors: Mannold Van De Schootbrugge, Eindhoven (NL); Daniel Alonzo Dirksz, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 58 days.

(21) Appl. No.: 18/574,767

(22) PCT Filed: Jun. 20, 2022

(86) PCT No.: PCT/EP2022/066679

§ 371 (c)(1),
(2) Date: Dec. 28, 2023

(87) PCT Pub. No.: WO2023/274764

PCT Pub. Date: Jan. 5, 2023

(65) Prior Publication Data

US 2024/0293945 A1 Sep. 5, 2024

(30) Foreign Application Priority Data

Jun. 29, 2021 (EP) .................................... 21182267

(51) Int. Cl.
*B26B 21/40* (2006.01)

(52) U.S. Cl.
CPC ...... *B26B 21/4087* (2013.01); *B26B 21/4056* (2013.01)

(58) Field of Classification Search
CPC ............ B26B 21/4087; B26B 21/4056; B26B 21/222; B26B 21/526; B26B 21/40
(Continued)

(56) References Cited

U.S. PATENT DOCUMENTS 5,600,888 A 2/1997 Becker
7,100,283 B1 9/2006 Grdodian et al.
(Continued)

FOREIGN PATENT DOCUMENTS

EP 4112253 A1 1/2023
EP 4363179 B1 1/2025
(Continued)

OTHER PUBLICATIONS

WO-2014032236-A1, Translation (Year: 2025).*
(Continued)

*Primary Examiner* — Nhat Chieu Q Do

(57) ABSTRACT

According to an aspect, there is provided a computer-implemented method (100) for monitoring usage of a cutting element of a hair cutting device, the method comprising: receiving (102) pressure data indicative of a pressure applied by a cutting element of a hair cutting device on a surface at intervals during a cutting event; storing (104) the received pressure data in a storage device; estimating (106), based on pressure data stored in the storage device in relation to the cutting event and on pressure data stored in the storage device in relation to one or more previous cutting events, a level of wear of the cutting element; and providing (108) an indication of the estimated level of wear for presentation to a recipient.

9 Claims, 4 Drawing Sheets

(58) Field of Classification Search
USPC .......................................................... 83/41.7
See application file for complete search history.

(56) References Cited

U.S. PATENT DOCUMENTS

| | | | |
|---|---|---|---|
| 8,122,606 | B2 | 2/2012 | Hart |
| 2008/0172880 | A1 | 7/2008 | Freund |
| 2009/0071010 | A1 | 3/2009 | Hart |
| 2015/0051845 | A1 | 2/2015 | Alhashemi |
| 2016/0046028 | A1 | 2/2016 | Meier |
| 2017/0307494 | A1 | 10/2017 | Drake et al. |
| 2018/0126571 | A1 | 5/2018 | Rothschild |
| 2018/0354147 | A1 | 12/2018 | Goldfarb |
| 2019/0022486 | A1 | 1/2019 | Jaw |
| 2019/0224868 | A1 | 7/2019 | Robinson |
| 2019/0224869 | A1 * | 7/2019 | Robinson .............. B26B 21/227 |
| 2020/0316799 | A1 | 10/2020 | Tsegenidis et al. |

FOREIGN PATENT DOCUMENTS

| | | | | |
|---|---|---|---|---|
| WO | WO-2014032236 | A1 * | 3/2014 | ......... B26B 21/4087 |
| WO | 2021262955 | A1 | 12/2021 | |

OTHER PUBLICATIONS

Sengupta et al., "Ultralightweight and 3D Squeezable Graphene-Polydimethylsiloxane Composite Foams as Piezoresistive Sensors", ACS Appl. Mater. Interfaces 2019, 11, pp. 35201-35211.

International Search report and Written Opinion of PCT/EP2022/066679, dated Oct. 10, 2022.

Communication of notice of opposition dated Nov. 3, 2025, from the European Patent Office, including a notice of opposition to European Patent No. EP 4363179.

* cited by examiner

MONITORING USAGE OF A HAIR CUTTING DEVICE

CROSS-REFERENCE TO PRIOR APPLICATIONS

This application is the U.S. National Phase application under 35 U.S.C. § 371 of International Application No. PCT/EP2022/066679, filed on Jun. 20, 2022, which claims the benefit of European Patent Application No. 21182267.1, filed on Jun. 29, 2021. These applications are hereby incorporated by reference herein.

FIELD OF THE INVENTION

The invention relates to monitoring usage of a hair cutting device and, more particularly, to monitoring usage of a cutting element of a hair cutting device.

BACKGROUND OF THE INVENTION

Personal care devices, such as hair cutting devices, may be used to perform personal care activities, such as shaving, cutting or trimming hair. Such a device may typically include a body portion that a user holds during use, and a cutting element, which may include one or more blades, for example, to cut a subject's hair during use.

As a hair cutting device is used, it's cutting element or portions thereof (e.g. the blades) may become worn and, therefore, less effective. A worn or blunt cutting element may not cut hair as effectively as a new cutting element and, in some cases, a worn cutting element may pose a safety risk to a user, for example if a blade becomes jagged.

U.S. Pat. No. 8,122,606 discusses a powered wet razor device having an electrical arrangement for tracking a remaining utility of the razor blade based on an expected utility and a tracked utility.

US patent application 2008/0172880 discusses a powered wet shaving razor providing a usage signal indicative of use of a cartridge.

It can, therefore, be useful to know when a cutting element of a hair cutting device is becoming worn. A visual inspection is one way of determining the extent to which a cutting element is worn, but this may not be a reliable method, particularly if the cutting element is hidden or obscured from view by another component of the hair cutting device. Therefore, there is a need for a method of determining an approximate degree of wear of a cutting element of a hair cutting device that does not require a visual inspection.

SUMMARY OF THE INVENTION

In order to ensure that a hair cutting device is operating as intended, and/or in an intended manner, it is useful to be able to monitor the usage of the cutting element of a hair cutting device, such that the cutting element and/or the hair cutting device can be replaced if it is determined that the cutting element has been worn through the use by such an extent that it is unlikely to be functioning as effectively as intended.

Various metrics may be monitored in order to determine the wear of a cutting element of a hair cutting device. The inventors of the present application have recognised that a particularly beneficial metric that can be monitored is the pressure applied by the cutting element onto a surface (e.g. the skin of a subject) during use. In general, a cutting element that is urged onto a user's skin with a relatively greater force or pressure is likely to become worn relatively quicker than a cutting element that is urged onto a user's skin with a relatively lower force or pressure. Thus, a cutting element to which a relatively greater force is applied is likely to need replacing quicker than the cutting element to which a relatively lower force is applied. In embodiments disclosed herein, a pressure applied by the cutting element onto a surface of the subject (e.g. the subject's skin) during use is monitored over time, and this is used to estimate an amount of wear of the cutting element. Consequently, this may be used to estimate when the cutting element should be replaced or disposed of.

According to a first specific aspect, there is provided a computer-implemented method for monitoring usage of a cutting element of a hair cutting device, the method comprising: receiving pressure data indicative of a pressure applied by a cutting element of a hair cutting device on a surface at intervals during a cutting event; storing the received pressure data in a storage device; estimating, based on pressure data stored in the storage device in relation to the cutting event and on pressure data stored in the storage device in relation to one or more previous cutting events, a level of wear of the cutting element; and providing an indication of the estimated level of wear for presentation to a recipient.

Estimating a level of wear of the cutting element comprises determining, based on a summation or numerical integration of the stored pressure data relating to the cutting event and the stored pressure data relating to the one or more previous cutting events, a total pressure applied by the cutting element to the surface since a defined start point; and estimating the level of wear based on the calculated summed or integrated pressure data.

The method may further comprise, responsive to determining that the estimated level of wear meets a defined threshold condition, generating an alert signal for delivery to a recipient.

The received data may, in some embodiments, comprise data obtained from a pressure sensor configured to measure, at intervals during the cutting event, a pressure applied by the cutting element of the hair cutting device on the surface.

In some embodiments, the method may further comprise receiving, at intervals during the cutting event, electrical current data indicative of an electrical current across a motor that drives the cutting element of the hair cutting device. Estimating a level of wear of the cutting element may be further based on the received electrical current data.

The method may further comprise applying a low-pass filter to the received electrical current data.

In some embodiments, the method may further comprise determining, based on the pressure data stored in the storage device in relation to the cutting event and on pressure data stored in the storage device in relation to one or more previous cutting events, a total duration that the cutting element has been used during cutting events. Estimating a level of wear of the cutting element may be further based on the determined total duration.

In some embodiments, estimating a level of wear of the cutting element may comprise determining a probability that the cutting element is worn to an extent such that the cutting element is to be replaced.

According to a second aspect, there is provided a computer program product comprising a non-transitory computer-readable medium, the computer-readable medium having computer readable code embodied therein, the computer-readable code being configured such that, on execution by a suitable computer or processor, the computer or processor is caused to perform steps of the methods disclosed herein.

According to a third aspect, there is provided a hair cutting device comprising a cutting element configured to cut hairs extending from a surface of a subject; a pressure sensor configured to measure a pressure applied by the cutting element on the surface of the subject during a hair cutting event; and a processor configured to: provide data indicative of the pressure for storage in a storage device; estimate, based on pressure data stored in the storage device in relation to the cutting event and on pressure data stored in the storage device in relation to one or more previous cutting events, a level of wear of the cutting element; and provide an indication of the estimated level of wear for presentation to a recipient.

The processor is configured to determine, based on a summation or numerical integration of the stored pressure data relating to the cutting event and the stored pressure data relating to the one or more previous cutting events, a total pressure applied by the cutting element to the surface since a defined start point. The processor may be configured to estimate the level of wear based on the calculated summed or integrated pressure data.

In some embodiments, the hair cutting device may further comprise a current measurement unit configured to measure an electrical current across a motor that drives the cutting element of the hair cutting device. The processor may be configured to estimate a level of wear of the cutting element further based on electrical current data measured using the current measurement unit.

In some embodiments, the processor may be configured to determine, based on the pressure data stored in the storage device in relation to the cutting event and on pressure data stored in the storage device in relation to one or more previous cutting events, a total duration that the cutting element has been used during cutting events; and estimate a level of wear of the cutting element is further based on the determined total duration.

The hair cutting device may, in some embodiments, further comprise a communication unit. The processor may be configured to provide data indicative of the measured pressure for storage in a storage device by transmitting the data, using the communication unit, to a storage device located remotely with respect to the hair cutting device.

The hair cutting device may further comprise a filter component configured to filter the data indicative of the pressure prior to the processor estimating the level of wear.

These and other aspects will be apparent from and elucidated with reference to the embodiment(s) described hereinafter.

BRIEF DESCRIPTION OF THE DRAWINGS

Exemplary embodiments will now be described, by way of example only, with reference to the following drawings, in which.

DETAILED DESCRIPTION OF THE EMBODIMENTS

Various embodiments disclosed herein provide a mechanism for monitoring usage of a cutting element of a hair cutting device to enable a determination or estimation of a degree of wear of the cutting element. Embodiments make use of measurements of the pressure applied by the cutting element of a hair cutting device onto the surface of a subject's skin while the hair cutting device is in use. As discussed below, the pressure measurements may, in some examples, be supplemented with other data in order to provide an even more thorough estimation of the wear of the cutting element.

Some embodiments are described in the context of a hair cutting device, which is intended to include any personal care device having a cutting element capable of cutting a subject's hair, including a shaver, clippers or a hair trimmer, for example. In some embodiments, the cutting element of the hair cutting device may be removable (e.g. detachable from a body portion of the hair cutting device) such that the cutting element can be replaced with a newer, less worn cutting element.

Figure 1:
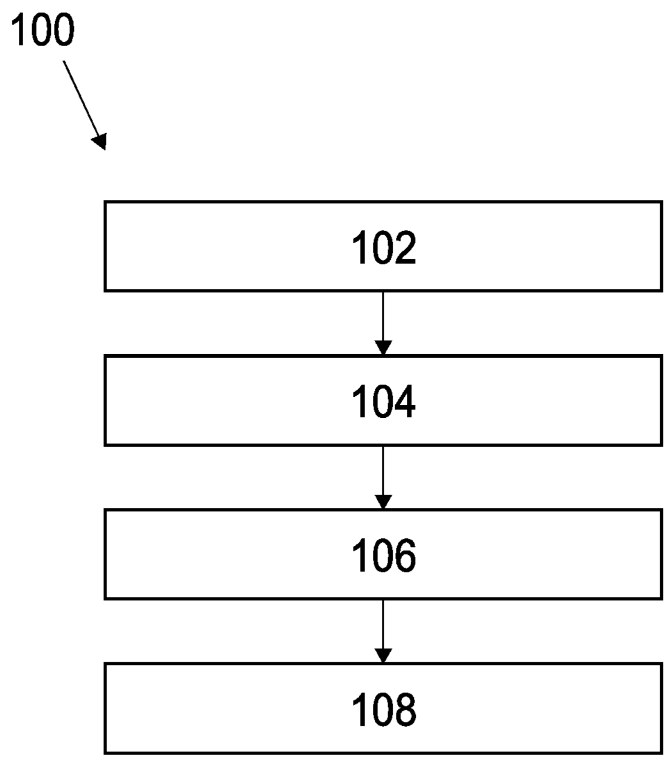
FIG. 1 is a flowchart of an example of a method for monitoring usage of a cutting element.

A first aspect of the invention provides a method. Referring now to the drawings, FIG. 1 is a flowchart of an example of a method 100. The method 100, which may comprise a computer-implemented method, may be considered to be a method for monitoring usage of a cutting element of a hair cutting device. The method 100 may, for example, be performed using a processor or multiple processors. The method 100 comprises, at step 102, receiving pressure data indicative of a pressure applied by a cutting element of a hair cutting device on a surface at intervals during a cutting event. The hair cutting device may, for example, be held by a user during use and the cutting element of hair cutting device may be positioned such that it touches or engages the surface, such as a surface of skin of the user or of some of the subject. The hair cutting device may be used to cut, trim, shave or otherwise remove hair from the surface (e.g. skin) of the subject. As such, the cutting element may, in some examples, include one or more blades or other components capable of cutting hair.

In the context of the present disclosure, a "cutting event" may be considered to be a treatment session or cutting session, where the hair cutting device is used over a period of time to cut hair. For example, a single cutting event may be considered to start when the hair cutting device is switched on and to end when the hair cutting devices switched off. In other examples, a cutting event may be defined differently. For example, a single cutting event may be considered to start when the cutting element engages the surface and to end when the cutting element is removed from the surface.

At intervals during a cutting event, pressure data is received, which is indicative of a pressure applied by the cutting element on the surface. As will be apparent from the discussion below, the pressure data may be obtained in a variety of ways, including through the use of one or more pressure or force sensors. A further indication of the pressure applied by the cutting element on the surface may be determined through measurements of an electrical current across a motor used to drive the cutting element. The amount of pressure data received during the cutting event may depend on the number and/or size of the intervals. In other words, the more regular the pressure data measurements are made or obtained, the more pressure data may be received. In some examples, pressure data may be acquired (e.g. measurements may be made using a pressure or force sensor) at regular intervals, such as every 1 second, 0.5 seconds, 0.1 seconds or the like. In other examples, pressure data may be acquired continuously during the cutting event.

At step 104, the method 100 comprises storing the received pressure data in a storage device. The storage device may comprise a storage medium located in the hair cutting device itself or in a storage medium located remotely with respect to the hair cutting device. For example, the pressure data may be stored in a storage medium of a computing device such as a smart phone, a tablet computer, a laptop computer, an interactive mirror, and the like. In some examples, the pressure data may be stored in a server, for example in a cloud-based storage medium. In addition to storing pressure data received in relation to the latest cutting event (e.g. a current cutting event), the storage device may be used to store pressure data received in relation to past or previous cutting events. That is to say, pressure data acquired in respect of a particular cutting element (e.g. for a particular user) may be stored in the storage device, thereby creating a record of historical usage data detailing the pressure applied by the cutting element onto a surface at intervals during past cutting events and the latest cutting event.

The method 100 comprises, at step 106, estimating, based on pressure data stored in the storage device in relation to the cutting event and on pressure data stored in the storage device in relation to one or more previous cutting events, a level of wear of the cutting element. Due to the correlation between the pressure applied by the cutting element onto a surface during a cutting event and the amount of wear that a cutting element experiences, monitoring the pressure data over a plurality of cutting events enables an estimation to be made regarding the likely degree of wear of the cutting element. In one example, an estimation of the level of wear of the cutting element may be determined based on a total pressure applied by the cutting element on a surface during cutting events (e.g. during the latest cutting event and the one or more previous cutting events) from a defined start time or start point. The defined start time or start point may, for example, comprise the start of the first cutting event performed using a new cutting element (e.g. when the hair cutting device is used for the first time or when a new cutting element has been installed on the hair cutting device to replace an older cutting element). Thus, the pressure data stored in the storage device may relate to a particular cutting element.

At step 108, the method 100 comprises providing an indication of the estimated level of wear for presentation to a recipient. The indication of the estimated level of wear may, for example, be generated by a processor or processors performing the method 100, and delivered to a display unit (e.g. a display screen) of the hair cutting device or of another device (e.g. a smart phone or an interactive mirror) for presentation. The recipient of the presented data may for example be the user of the hair cutting device and/or the subject whose hair is being cut using the hair cutting device. The indication presented to the recipient may take the form of a textual notification, a graphical notification, an audible notification, or any other form of notification capable of indicating to the recipient a level of wear of the cutting element. In some examples, the indication may be provided in terms of a percentage, where 0% wear indicates a cutting element that has not been used for has not been subject to sufficient pressure to lead to any noticeable wear, and 100% wear indicates a cutting element that has been subjected to a significant amount of usage or has been used to apply a significant total pressure to a surface such that it is estimated that the cutting element is fully worn, or is worn to an extent that it should be replaced. "Fully worn" in the context of the present disclosure is intended to refer to a state in which the cutting element has been worn to such an extent that it has reached the end of its intended, effective, useful and/or safe life.

By providing the recipient of the indication (e.g. a user of the hair cutting device) with an indication notifying them of the extent to which the cutting element is likely to have been worn through use, the user is able to understand approximately how much effective or useful 'life' is left in the cutting element. Over time, as the cutting element becomes more and more worn, the user will be able to determine from the presented indication that the cutting element is estimated to be approaching the end of its effective or useful life (e.g. from an indication that the cutting element is 90% worn) and the user may take action to replace the cutting element with a new cutting element. As noted above, as a cutting element becomes more worn through use, its blades may become less sharp and less effective at cutting hair. Consequently, a user of a worn cutting element may experience a relatively poorer cutting experience, which could take longer than a cutting event in which a new cutting element is used. Moreover, in some cases, a cutting element may even become less safe to use as it deteriorates with excessive wear. Thus, a user who is notified of the estimated wear of a cutting element through the methods disclosed herein may take action to replace the cutting element before it reaches a stage where it could become potentially unsafe and damaging to the user.

Figure 2:
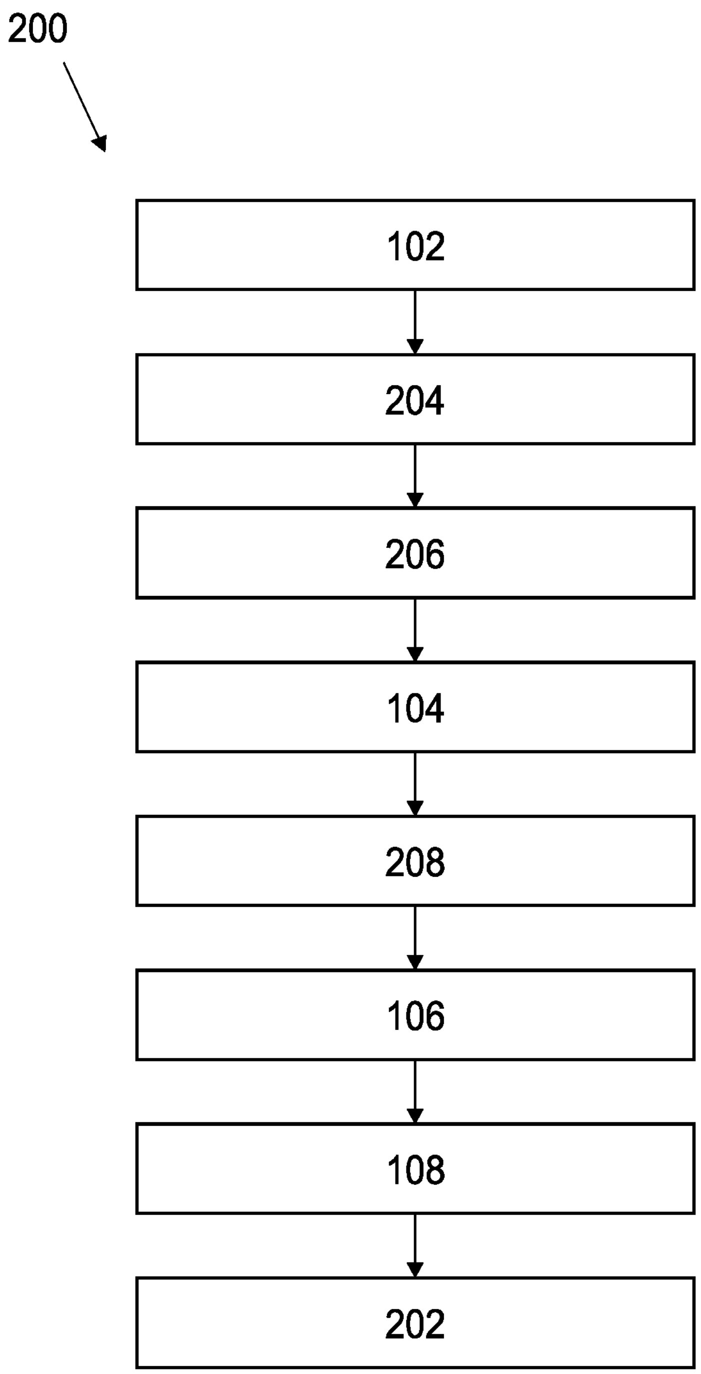
FIG. 2 is a flowchart of a further example of a method for monitoring usage of the cutting element.

FIG. 2 is a flowchart of a further example of a method 200. The method 200, which may also be a computer-implemented method for monitoring usage of a cutting element of a hair cutting device, may include one or more steps of the method 100 discussed above. In some embodiments, estimating (step 106) a level of wear of the cutting element may comprise determining, based on a summation or numerical integration of the stored pressure data relating to the cutting event and the stored pressure data relating to the one or more previous cutting events, a total pressure applied by the cutting element to the surface since a defined start point. In other words, the pressure data relating to the cutting event (e.g. the latest or current cutting event) and the pressure data stored in a storage device relating to the previous cutting events may be summed or numerically integrated over time in order to determine a total pressure (e.g. a cumulative pressure) that has been applied by the cutting element to a surface since the defined start point. The defined start point may, for example, comprise a point in time when the cutting element was first used. The start point may, in some examples, be detected automatically, for example when the cutting element is installed on the hair cutting device. In other examples, the start point may be indicated manually, for example through a user input. A new start point (e.g. from which to start recording pressure data) may be assigned or set each time the cutting element is replaced.

The estimating step (step 106) may further comprise estimating the level of wear based on the calculated summed or integrated pressure data. For example, various pressure thresholds may correspond to estimated levels of wear, such that when the cumulative pressure (e.g. the summed or integrated pressure) reaches a first threshold, it may be estimated that the cutting element has been worn down to 50% of its effective life and when the cumulative pressure reaches the second threshold, it may be estimated that the cutting element has been worn completely (e.g. 100%) and has reached the end of its effective life.

Figure 3:
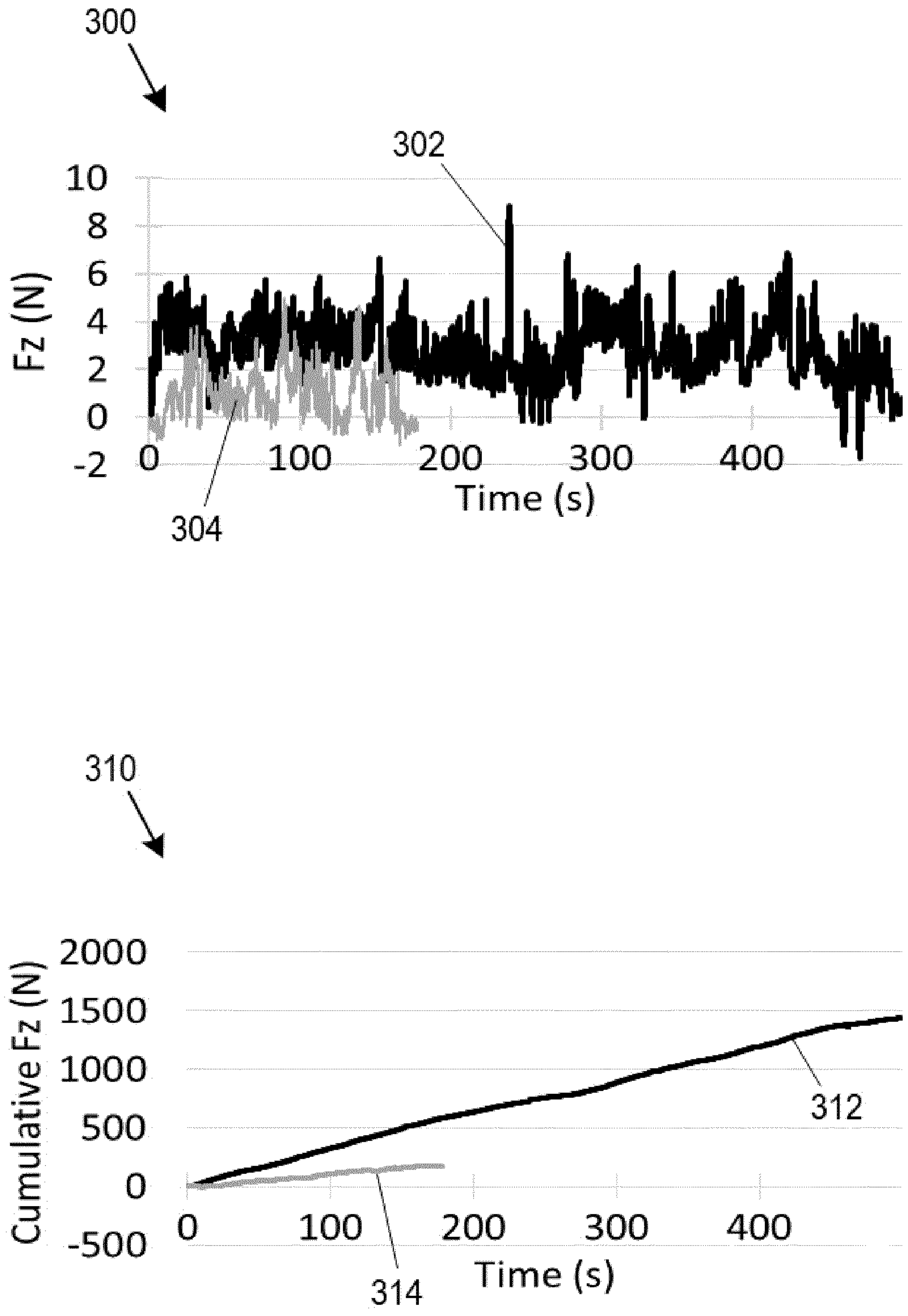
FIG. 3 shows two graphs of example data acquired in respect of hair cutting events.

FIG. 3 shows two graphs, 300 and 310 of example data acquired in respect of two different people, person A and person B, over the course of a single cutting event (e.g. for a single shaving session). In this example, the graphs show a force applied by the cutting element on a surface. In the graph 300, force data (which could be converted into pressure data) measured in respect of person A is shown by a line 302, and force data measured in respect of person B is shown by a line 304. The data represented by line 302 indicates that person A spent around 500 seconds (i.e. 8 minutes 20 seconds) using the cutting element, and applied an average force of around 4 N over the course of the cutting event. The data represented by line 304 indicates that person B spent around 180 seconds (i.e. 3 minutes) using the cutting element, and applied an average force of around 1 to 2 N over the course of the cutting event. The graph 310 shows the force data from the graph 300 has a cumulative signal for each of a person A and person B. Thus, a line 312 represents a cumulative signal (e.g. summed or numerically integrated data) for person A and a line 314 represents a cumulative signal (e.g. summed or numerically integrated data) for person B. It is clear that, due to the larger average force applied by person A during the cutting event, the total/cumulative force applied by person A is far larger than the total/cumulative force applied by person B. By adding data acquired in respect of previous cutting events, for example all cutting events performed using the cutting element since the cutting element was new, it is possible to determine the total/cumulative force for a given cutting element.

Referring again to FIG. 2, the method 200 may further comprise, at step 202, responsive to determining that the estimated level of wear meets a defined threshold condition, generating an alert signal for delivery to a recipient. Thus, while the level of wear of the cutting device may be estimated and provided for presentation to a user throughout the life of the cutting element, an alert signal may be generated in the event that one or more defined threshold conditions are met. For example, in the event that the level of wear is estimated to meet or exceed a threshold corresponding to 50% of the cutting element's effective or useful life, then an alert signal may be generated that can be used to inform the user that the cutting element is approximately halfway through its useful life. Similarly, in the event that the level of wear is estimated to meet or exceed a threshold corresponding to, for example, 95% of the cutting element's intended, effective or useful life, then an alert signal may be generated that can be used to inform the user that the cutting element is reaching the end of its useful life. This enables the user to replace the cutting element with a new/unused cutting element, which should give rise to an improved hair cutting experience. Other threshold conditions may be defined, and alert signals may be generated when the threshold conditions are met. For example, an alert signal may be generated if it is determined that a particular threshold (e.g. corresponding to 30% wear) is reached within a defined duration of usage. This, for example, may be indicative that the user of the cutting element is applying too much force or pressure during use.

As noted previously, and as discussed in greater detail below, the received data may, in some embodiments, comprise data obtained from a pressure sensor configured to measure, at intervals during the cutting event, a pressure applied by the cutting element of the hair cutting device on the surface. In other embodiments, the received data may comprise data obtained from a force sensor configured to measure, at intervals during the cutting event, a force applied by the cutting element of the hair cutting device on the surface. With knowledge of the size of the cutting area and, in particular, of the surface area of the cutting element that contacts the surface of the subject during use, the pressure can be calculated from a force measurement. The processor or processors performing the method 100, 200 may, for example, be in communication with a force or pressure sensor such that the force or pressure measurements can be received from the force sensor or pressure sensor in real time use or at the end of a cutting event, for example once the user has finished cutting their hair and removes the hair cutting device from their skin or switches off the hair cutting device.

Force or pressure sensors provide a reliable and accurate means for obtaining an indication of the force or pressure applied by the cutting element on the surface during a cutting event. In some embodiments, however, the data obtained using a pressure sensor may be supplemented with other data in order to provide an even more accurate estimation of the wear of the cutting element. In some examples, the hair cutting device may include a motor configured to drive the cutting element during use. For example, such a motor may cause reciprocating motion or circular motion of one or more blades of the cutting element to the effect hair cutting when brought into contact with hair During use, a force is applied which urges the cutting element onto the surface being treated, and this causes a torque of the motor to change. An electrical current across the motor varies as a function of the torque of the motor and, therefore, changes in torque resulting from a force being applied by the cutting element onto the surface are evident in measurements of the electrical current. Thus, by monitoring the electrical current across the motor during a cutting event, it is possible to determine an indication of a pressure or force applied by the cutting element on the surface, and this can be used to determine an estimate of the level of wear of the cutting element. The estimated level of wear determined using the electrical current across the motor may be combined with the estimated level of wear determined using pressure data obtained from sensors in order to achieve an even more accurate estimate.

Thus, the method 200 may comprise, at step 204, receiving, at intervals during the cutting event, electrical current data indicative of an electrical current across a motor that drives the cutting element of the hair cutting device. The step of estimating a level of wear of the cutting element (step 106) may be further based on the received electrical current data. The method may, in some embodiments, further comprise storing the received electrical current data in a storage device, which may be the same storage device used to store the received pressure data. Electrical current data may be received and stored in relation to the current/present cutting event, an electrical current data may be stored in relation to previous/past cutting events. For example, the storage device may store electrical current data relating to the same cutting events for which pressure data is available. As with the pressure data, changes in the electrical current may be summed or numerically integrated in order to determine a total cumulative effect on the electrical current over a plurality of cutting events, since a defined start point.

In some embodiments, estimating the level of wear of the cutting element based on both the pressure data and the received electrical current data may be achieved using lookup tables. For example, a particular total or cumulative pressure may correspond to particular estimated level of wear of the cutting element, and a particular total or cumulative measure of changes in the electrical current may correspond to a particular estimated level of wear of the cutting element. The estimated level of wear based on the pressure data and the estimated level of wear based on the electrical current measurements may be combined in some way (e.g. an average may be taken) in order to determine a more accurate estimate of the level of wear of the cutting element.

During use, other forces acting on the cutting element may also affect the torque of the motor, leading to disturbances in an electrical current measurement signal when measuring the electrical current across the motor. In some embodiments, therefore, one or more filters may be used to filter out those disturbances in the measurement signal that do not result from pressure being applied by the cutting element on the surface. Thus, the method 200 may comprise, at step 206, applying a low-pass filter to the received electrical current data. In this way, the received electrical current data that is taken into account when estimating the level of wear of the cutting element is the electrical current data that is indicative of the pressure applied by the cutting element onto the surface.

One or more filters may also be applied to the received pressure data. For example, a low-pass filter may be applied to the pressure data in order to filter out high-frequency noise or disturbances that do not relate to the hair cutting activity but which could influence determinations made using the data. In some embodiments, a notch filter may be used to filter out particular electromechanical characteristics of the motor, such as commutation spikes. Filtering may be achieved using hardware components and/or using a processor.

In addition to the received pressure data, or in addition to the received pressure data and the received electrical current data, the estimation of the level of wear of the cutting element may be based further on additional data including, for example, a total duration for which the cutting element has been used. While the duration of use of the cutting element may itself not provide an accurate indication of a level of wear of the cutting element, such an estimation may be improved if the duration of use is combined with the pressure data and/or the electrical current data. Thus, the method 200 may comprise, at step 208, determining, based on the pressure data stored in the storage device in relation to the cutting event and on pressure data stored in the storage device in relation to one or more previous cutting events, a total duration that the cutting element has been used during cutting events. As shown in FIG. 3, the stored pressure data includes an indication of the duration of each cutting event, and this can be used to determine the total duration that the cutting element has been used, for example since the defined start point (e.g. when the cutting element was first used). Estimating the level of wear of the cutting element (step 106) may be further based on the determined total duration. For example, a particular total duration of use of a cutting element may correspond to a particular estimated level of wear; 0 minutes of use may correspond to an estimated 0% of wear of the cutting element, and 160 minutes of use may correspond to an estimated 100% of wear of the cutting element. Lookup tables may be used to determine the correspondence. As described above for the electrical current data, an estimated level of wear may be determined based on the total duration of use of the cutting element, and this may be combined with the estimated level of wear determined based on the pressure data and/or on the electrical current data (e.g. by averaging the estimated levels of wear) in order to determine the overall estimated level of wear of the cutting element. In another example, conditional probability techniques may be applied in order to combine the various estimated levels of wear. For example, a probability may be determined corresponding to each of the estimated levels of wear, and the probabilities may be multiplied together in order to obtain an overall probability that the cutting element has worn to a level where it is to be replaced.

In some embodiments, estimating a level of wear of the cutting element may comprise determining a probability that the cutting element is worn to an extent such that the cutting element is to be replaced. For example, any of the metrics used to estimate the level of wear may correspond to a probability that the cutting element is worn by a certain amount. In other words, it cannot be known with absolute certainty that, once a cutting element has been urged onto a subject's skin with a particular threshold cumulative pressure, that the cutting element will be worn beyond its effective life, it may be considered that the likelihood or probability is that, after such use, the cutting element will be worn and due for replacement. Thus, in some embodiments, particular values in the received data (e.g. a particular cumulative pressure, a particular duration of use and/or a particular cumulative measure based on the electrical current data) may correspond to particular probabilities that the cutting element has been worn down by a given amount.

As noted above, using a cutting element that has been worn beyond a particular level may be unsafe for a user for example, blades of a cutting element may become blunt or jagged with use over time, particularly if the cutting element is pressed onto the subject's skin with a large force or pressure. In some embodiments, therefore, an action may be taken to reduce the risk of injuries occurring if it is likely that the cutting element has become damaged in this way. The action may, for example, comprise notifying the user that the cutting element should be replaced.

Figure 4:
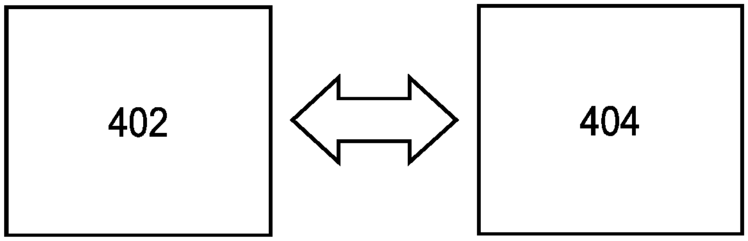
FIG. 4 is a schematic illustration of an example of a processor in communication with a computer-readable medium.

A further aspect of the present invention provides a computer program product. FIG. 4 is a schematic illustration of an example of a processor 402 in communication with a computer-readable medium 404. According to various embodiments, a computer program product comprises a non-transitory computer-readable medium 404, the computer-readable medium having computer-readable code embodied therein, the computer-readable code being configured such that, on execution by a suitable computer or processor 402, the computer or processor is caused to perform steps of the methods 100, 200 disclosed herein. The processor 402 may comprise a processor of the hair cutting device or a processor of a different electronic device, such as a smart phone. Alternatively, the processor 402 may comprise a remotely located processor, such as a cloud-based processing apparatus.

Figure 5:
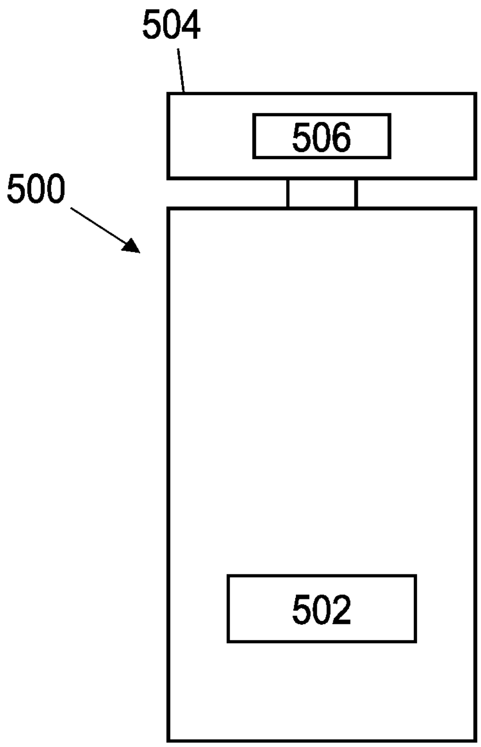
FIG. 5 is a schematic illustration of an example of a hair cutting device.

A further aspect of the present invention provides a hair cutting device. FIG. 5 is a schematic illustration of an example of a hair cutting device 500. The hair cutting device 500 comprises a processor 502, a cutting element 504 and a pressure sensor 506. The cutting element 504 is configured to cut hairs extending from a surface of a subject. For example, the cutting element may comprise one or more blades configured to trim or shave the hair on a person's head, body or face. The pressure sensor 506 is configured to measure a pressure applied by the cutting element 504 on the surface of the subject during a hair cutting event. As noted above, a hair cutting event may be considered to be a treatment session during which a user uses the hair cutting device 500 to cut their hair. Such a treatment session or hair cutting event may be considered to start when the user switches the hair cutting device 500 on and ended when the user switches the hair cutting device off.

The processor 502 is configured to provide data indicative of the pressure for storage in a storage device. The data indicative of the pressure may include a continuous pressure measurement signal over the duration of the cutting event or a plurality of pressure measurements acquired at intervals during the cutting event. The storage device may be located in the hair cutting device 500, and the processor 502 may be configured to provide the data to the storage device via a wired connection. In other examples, the storage device may be located remotely with respect to the hair cutting device 500, and the processor 502 may be configured to provide the data to the storage device via a wireless connection. The storage device may include pressure data acquired during previous cutting events performed using the same cutting element.

The processor 502 is also configured to estimate, based on pressure data stored in the storage device in relation to the cutting event and on pressure data stored in the storage device in relation to one or more previous cutting events, a level of wear of the cutting element. Thus, the processor 502 may determine an estimate of the level of wear of the cutting element based, for example, on a cumulative pressure (e.g. calculated by summing or numerically integrating the pressure data over the durations of the cutting events) applied by the cutting element on the surface of the subject. This function of the processor 502 may be considered to correspond to step 106 of the method 100, 200.

The processor 502 is also configured to provide an indication of the estimated level of wear for presentation to a recipient. In this regard, the hair cutting device 500 may further comprise a presentation interface, such as a display, a touchscreen, a speaker, a haptic element, or the like, capable of presenting the estimated level of wear to a recipient who may, for example, be a user of the hair cutting device and/or the subject whose hair is being cut. The indication of the estimated level of wear may be presented in the form of a percentage displayed numerically or audibly, or in the form of a plurality of lighting elements, whereby a proportion or number of the lighting elements that are illuminated depends on the estimated level of wear of the cutting element.

In some embodiments, the processor may be configured to determine, based on a summation or numerical integration of the stored pressure data relating to the cutting event and the stored pressure data relating to the one or more previous cutting events, a total pressure applied by the cutting element to the surface since a defined start point. The estimation of the level of wear by the processor 502 may be based on the calculated summed or integrated pressure data.

Figure 6:
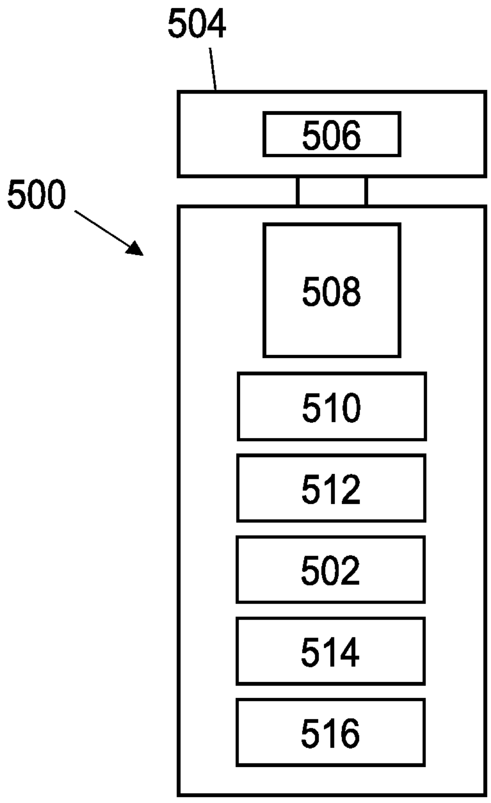
FIG. 6 is a schematic illustration of a further example of a hair cutting device.

FIG. 6 is a schematic illustration of a further example of the hair cutting device 500. The hair cutting device 500 shown in FIG. 6 includes the features of the hair cutting device shown in FIG. 5 and includes several additional optional features.

The hair cutting device 500 may comprise a motor 508 configured to drive the cutting element 504 during use. In some embodiments, the hair cutting device 500 may further comprise a current measurement unit 510 configured to measure an electrical current across the motor 508 that drives the cutting element 504 of the hair cutting device 500. The processor 502 may be configured to estimate a level of wear of the cutting element 504 further based on electrical current data measured using the current measurement unit 510. The estimation of the level of wear based on the electrical current data may be performed in accordance with the discussion of step 204 above.

Similarly, in accordance with the discussion of step 208 above, the processor 502 may further take account of a total duration of the use of the cutting element 504 in the estimation of the level of wear of the cutting element. Thus, the processor 502 may, in some embodiments, be configured to determine, based on the pressure data stored in the storage device in relation to the cutting event and on pressure data stored in the storage device in relation to one or more previous cutting events, a total duration that the cutting element has been used during cutting events. The processor 502 may be further configured to estimate a level of wear of the cutting element 504 further based on the determined total duration.

In some embodiments, the hair cutting device 500 may further comprise a storage device 512 configured to store data (e.g. pressure data and/or electrical current data) acquired and/or received using components of the hair cutting device. In other embodiments, hair cutting device 500 may not include a storage device 512 for storing the data; rather, the received data may be stored in a storage device located remotely with respect to the hair cutting device.

In some embodiments, the processor 502 may be configured to generate an alert signal in response to determining that data stored in the storage device meets a defined threshold condition. For example, an alert signal may be generated if the total or cumulative pressure or force exceeds a defined threshold. The processor 502 may provide the alert signal for delivery to a recipient, such as the user of the device and/or the subject whose hair is being cut.

The cutting element 504 may comprise a replaceable cutting element configured for example to have a finite useful life, whereby it is intended that the cutting element is replaced once it is estimated that the cutting element has reached the end of its useful life. The alert signal may comprise an indication to the recipient that the cutting element is to be replaced. For example, a message may be presented to the user of the hair cutting device 500 requesting them to "Replace blade now".

The hair cutting device 500 may, in some embodiments, further comprise a communication unit 514. For example, the communication unit 514 may enable data to be transmitted via a wireless communication protocol to a remotely-located processing device. In embodiments where the storage devices located remotely, the processor 502 may be configured to provide data indicative of the measured pressure for storage in a storage device by transmitting the data, using the communication unit 514, to a storage device located remotely with respect to the hair cutting device 500.

In some embodiments, the hair cutting device 500 may comprise a filter component 516 configured to filter the data indicative of the pressure prior to the processor 502 estimating the level of wear. In other embodiments, multiple filter components maybe provided. One or more filter components may comprise a low-pass filter or a notch filter. As discussed above, the filter or filters may be provided for filtering out parts of the obtained data (e.g. parts of a measured signal) that do not relate to the application of pressure on the cutting element 504.

Embodiments disclosed herein provide a mechanism by which the level of wear of the cutting element of the hair cutting device may be estimated based on the amount of pressure or force experienced by the cutting element as a result of being in contact with a surface (e.g. a subject's skin) during use. An accurate determination of the amount of wear of a blade of a cutting element may require detailed examination, for example using a microscope; however, using the techniques disclosed herein combined with experimental data of a group of representative users, an estimation of the level of where can be made which can provide a user with an indication of when the cutting element should be replaced. Monitoring the wear of the cutting element and informing the user in advance of the cutting element reaching the end of its useful life can help to reduce the likelihood of incidents occurring that could lead to use injuries, for example if the blade of the cutting element became jagged and unsafe.

The processor 402, 502 can comprise one or more processors, processing units, multi-core processors or modules that are configured or programmed to control the hair cutting device 500 in the manner described herein. In particular implementations, the processor 402, 502 can comprise a plurality of software and/or hardware modules that are each configured to perform, or are for performing, individual or multiple steps of the method described herein.

The term "module", as used herein is intended to include a hardware component, such as a processor or a component of a processor configured to perform a particular function, or a software component, such as a set of instruction data that has a particular function when executed by a processor.

It will be appreciated that the embodiments of the invention also apply to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to embodiments of the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A computer-implemented method for monitoring usage of a cutting element of a hair cutting device, the cutting element having one or more blades, the method comprising steps of:

receiving pressure data from a pressure sensor configured to measure, at intervals during a cutting event, a pressure applied by the cutting element of the hair cutting device on a surface of a subject's skin;

storing the pressure data received in the receiving step in a storage device;

receiving, at intervals during the cutting event, electrical current data indicative of an electrical current across a motor that drives the cutting element of the hair cutting device:

applying a low-pass filter to the electrical current data received in the receiving step, to define a low-pass-filtered electrical current data;

determining, by a processor, based on a summation or numerical integration of the pressure data stored in the storage device relating to the cutting event and the pressure data stored in the storage device relating to the one or more previous cutting events, a total pressure applied by the cutting element to the surface since a defined start point; and estimating, by the processor, a level of wear of the cutting element based on the total pressure and further based on the low-pass-filtered electrical current data; and providing, by the processor, an indication of the estimated level of wear for presentation to a recipient.

2. The computer-implemented method according to claim 1, further comprising:

responsive to determining that the estimated level of wear meets a defined threshold condition, generating, by the processor, an alert signal for delivery to the recipient.

3. The computer-implemented method according to claim 1, further comprising:

determining, by the processor and based on the pressure data stored in the storage device in relation to the cutting event and on the pressure data stored in the storage device in relation to one or more previous cutting events, a total duration that the cutting element has been used during cutting events;

wherein estimating the level of wear of the cutting element is further based on the determined total duration.

4. The computer-implemented method according to claim 1, wherein the cutting element has an effective life, and wherein estimating the level of wear of the cutting element comprises determining a probability that the cutting element is worn beyond the effective life.

5. A computer program product comprising a non-transitory computer-readable medium, the computer-readable medium having computer readable code embodied therein, the computer-readable code being configured such that, on execution by a suitable computer or processor, the computer or processor is caused to perform the method of claim 1.

6. A hair cutting device comprising:

a cutting element having one or more blades configured to cut hairs extending from a surface of a subject;

a pressure sensor configured to measure a pressure applied by the cutting element on the surface of the subject's skin during a hair cutting event;

a motor configured to drive the cutting element;

a current measurement unit configured to measure an electrical current across the motor; and a processor configured to:

receive pressure data from the pressure sensor;

store the pressure data in a storage device;

receive, at intervals during the cutting event, electrical current data from the current measurement unit;

apply a low-pass filter to the electrical current data received in the receiving step, to define a low-pass-filtered electrical current data;

determine, based on a summation or numerical integration of the pressure data stored in the storage device relating to the cutting event and the pressure data stored in the storage device relating to the one or more previous cutting events, a total pressure applied by the cutting element to the surface since a defined start point;

estimate a level of wear of the cutting element based on the total pressure and further based on the low-pass-filtered electrical current data and provide an indication of the estimated level of wear for presentation to a recipient.

7. The hair cutting device according to claim 6, wherein the processor is further configured to:

determine, based on the pressure data stored in the storage device in relation to the cutting event and on the pressure data stored in the storage device in relation to one or more previous cutting events, a total duration that the cutting element has been used during cutting events; and estimate the level of wear of the cutting element is-further based on the determined total duration.

8. The hair cutting device according to claim 6, further comprising:

a communication unit;

wherein the processor is further configured to provide data indicative of the measured pressure, and wherein the communication unit is configured to transmit the data indicative of the measured pressure to a remote storage device device located remotely with respect to the hair cutting device.

9. The hair cutting device according to claim 6, further comprising:

a filter component configured to filter the pressure data prior to the processor estimating the level of wear.

* * * * *